United States Patent
Tsai et al.

(10) Patent No.: US 11,863,373 B2
(45) Date of Patent: Jan. 2, 2024

(54) METHOD AND USER EQUIPMENT FOR BEAM FAILURE RECOVERY PROCEDURE

(71) Applicant: FG Innovation Company Limited, Tuen Mun (HK)

(72) Inventors: Hsin-Hsi Tsai, Taipei (TW); Chia-Hung Wei, Taipei (TW); Heng-Li Chin, Taipei (TW); Chie-Ming Chou, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/033,160

(22) Filed: Sep. 25, 2020

(65) Prior Publication Data

US 2021/0105176 A1 Apr. 8, 2021

Related U.S. Application Data

(60) Provisional application No. 62/909,966, filed on Oct. 3, 2019.

(51) Int. Cl.
*H04W 24/08* (2009.01)
*H04L 41/0668* (2022.01)
(Continued)

(52) U.S. Cl.
CPC ...... *H04L 41/0668* (2013.01); *H04L 41/0816* (2013.01); *H04L 41/0896* (2013.01); *H04L 43/16* (2013.01); *H04W 72/23* (2023.01)

(58) Field of Classification Search
CPC .... H04B 7/0695; H04B 7/088; H04B 7/0617; H04W 72/0453; H04L 5/0023
See application file for complete search history.

(56) References Cited

U.S. PATENT DOCUMENTS

2016/0302176 A1* 10/2016 Ahn .................. H04W 72/23
2018/0368142 A1* 12/2018 Liou ................. H04W 74/0808
(Continued)

OTHER PUBLICATIONS

3rd Generation Partnership Project; Technical Specification Group Radio Access Network; NR; Medium Access Control (MAC) protocol specification (Release 15), 3GPP TS 38.321 V15.6.0 (Jun. 2019) (Year: 2019).*

(Continued)

*Primary Examiner* — Romani Ohri
(74) *Attorney, Agent, or Firm* — ScienBiziP, P.C.

(57) ABSTRACT

A method, performed by a User Equipment (UE), for a Beam Failure Recovery (BFR) procedure includes receiving, from a Base Station (BS), a BFR configuration for a serving cell of the BS, wherein the BFR configuration includes a threshold for a Beam Failure Instance (BFI) counter associated with the serving cell, and the threshold is associated with a beamFailureInstanceMaxCount information element (IE); incrementing a value of the BFI counter based on a Beam Failure Detection (BFD); triggering the BFR procedure for the serving cell when the value of the BFI counter is equal to or higher than the threshold; performing Band Width Part (BWP) switching for the serving cell when receiving a reconfiguration indication from the BS, wherein the reconfiguration indication includes a BWP index; and setting the value of the BFI counter to zero when performing the BWP switching.

12 Claims, 7 Drawing Sheets

(51) Int. Cl.
*H04L 41/0816* (2022.01)
*H04L 43/16* (2022.01)
*H04L 41/0896* (2022.01)
*H04W 72/23* (2023.01)

(56) References Cited

U.S. PATENT DOCUMENTS

| | | | | |
|---|---|---|---|---|
| 2019/0081691 | A1* | 3/2019 | Nagaraja | H04W 36/305 |
| 2019/0132109 | A1* | 5/2019 | Zhou | H04L 5/001 |
| 2019/0166539 | A1* | 5/2019 | Chen | H04W 36/0088 |
| 2019/0166555 | A1* | 5/2019 | Cheng | H04B 7/0695 |
| 2019/0173740 | A1* | 6/2019 | Zhang | H04W 72/042 |
| 2019/0200395 | A1* | 6/2019 | Agiwal | H04W 16/32 |
| 2019/0207667 | A1* | 7/2019 | Zhou | H04L 1/0057 |
| 2019/0215870 | A1* | 7/2019 | Babaei | H04W 56/0045 |
| 2019/0306867 | A1* | 10/2019 | Cirik | H04L 5/0023 |
| 2019/0373480 | A1* | 12/2019 | Go | H04L 43/16 |
| 2020/0106573 | A1* | 4/2020 | Cirik | H04W 74/0833 |
| 2020/0205193 | A1* | 6/2020 | Amuru | H04W 52/36 |
| 2020/0260428 | A1* | 8/2020 | Xu | H04W 76/27 |
| 2020/0314722 | A1* | 10/2020 | Kyung | H04W 36/305 |
| 2020/0374960 | A1* | 11/2020 | Deenoo | H04W 74/0833 |
| 2020/0389847 | A1* | 12/2020 | Deng | H04W 52/0219 |
| 2020/0404690 | A1* | 12/2020 | Lee | H04W 72/1273 |
| 2021/0091844 | A1* | 3/2021 | Koskela | H04B 7/022 |

OTHER PUBLICATIONS

3rd Generation Partnership Project; Technical Specification Group Radio Access Network; NR; NR and NG-RAN Overall Description; Stage 2 (Release 15), 3GPP TS 38.300 V15.6.0 (Jun. 2019).

3rd Generation Partnership Project; Technical Specification Group Radio Access Network; NR; Physical layer procedures for control (Release 15), 3GPP TS 38.213 V15.6.0 (Jun. 2019).

3rd Generation Partnership Project; Technical Specification Group Radio Access Network; NR; Medium Access Control (MAC) protocol specification (Release 15), 3GPP TS 38.321 V15.6.0 (Jun. 2019).

3rd Generation Partnership Project; Technical Specification Group Radio Access Network; NR; Radio Resource Control (RRC) protocol specification (Release 15), 3GPP TS 38.331 V15.6.0 (Jun. 2019).

* cited by examiner

METHOD AND USER EQUIPMENT FOR BEAM FAILURE RECOVERY PROCEDURE

CROSS-REFERENCE TO RELATED APPLICATION(S)

The present disclosure claims the benefit of and priority to provisional U.S. Patent Application Ser. No. 62/909,966 ("the '966 provisional"), filed on Oct. 3, 2019, entitled "Method and apparatus for beam failure recovery for secondary cell". The contents of the '966 provisional are fully incorporated herein by reference for all purposes.

FIELD

The present disclosure generally relates to wireless communications, and more particularly, to methods and apparatuses for a beam failure recovery (BFR) procedure.

BACKGROUND

With the tremendous growth in the number of connected devices and the rapid increase in user/Network (NW) traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the NW services and types, accommodating various use cases such as Enhanced Mobile Broadband (eMBB), Massive Machine-Type Communication (mMTC), and Ultra-Reliable and Low-Latency Communication (URLLC).

However, as the demand for radio access continues to increase, there is a need in the art to make the BFR procedure more efficient.

SUMMARY

The present disclosure is directed to methods and apparatuses for BFR procedure.

According to an aspect of the present disclosure, a method, performed by a User Equipment (UE), for a Beam Failure Recovery (BFR) procedure is provided. The method includes receiving, from a Base Station (BS), a BFR configuration for a serving cell of the BS, wherein the BFR configuration includes a threshold for a Beam Failure Instance (BFI) counter associated with the serving cell, and the threshold is associated with a beamFailureInstanceMax-Count information element (IE); incrementing a value of the BFI counter based on a Beam Failure Detection (BFD); triggering the BFR procedure for the serving cell when the value of the BFI counter is equal to or higher than the threshold; performing Band Width Part (BWP) switching for the serving cell when receiving a reconfiguration indication from the BS, wherein the reconfiguration indication includes a BWP index; and setting the value of the BFI counter to zero when performing the BWP switching.

According to another aspect of the present disclosure, a UE for a BFR procedure is provided. The UE includes a memory and at least one processor coupled to the memory. The at least one processor is configured to receive, from a BS, a BFR configuration for a serving cell of the BS, wherein the BFR configuration includes a threshold for a BFI counter associated with the serving cell, and the threshold is associated with a beamFailureInstanceMaxCount information elementIE; increment a value of the BFI counter based on a BFD; trigger the BFR procedure for the serving cell when the value of the BFI counter is equal to or higher than the threshold; perform BWP switching for the serving cell when receiving a reconfiguration indication from the BS, wherein the reconfiguration indication includes a BWP index; and set the value of the BFI counter to zero when performing the BWP switching.

BRIEF DESCRIPTION OF THE DRAWINGS

Aspects of the present disclosure are best understood from the following when read with the accompanying figures. Various features are not drawn to scale. Dimensions of various features may be arbitrarily increased or reduced for clarity of discussion.

DESCRIPTION

Figure 1:
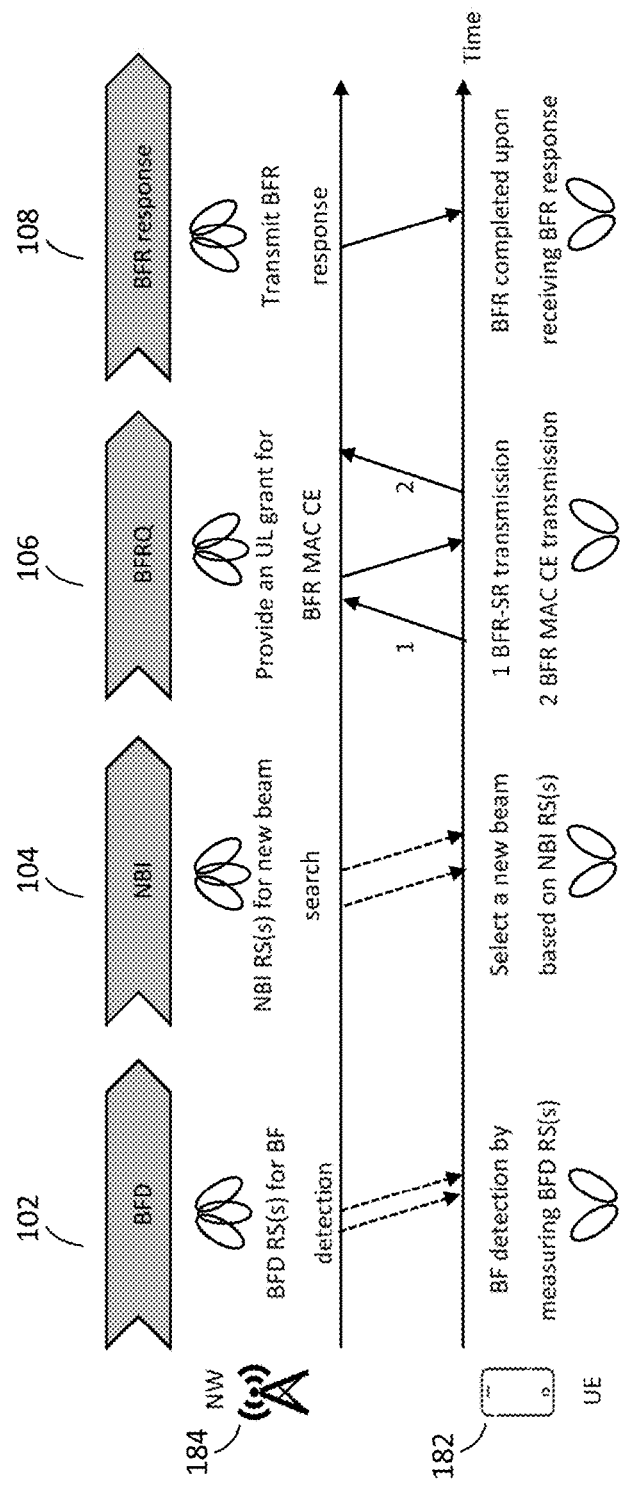
FIG. 1 illustrates a SCell BFR procedure according to an example implementation of the present disclosure.

The following contains specific information pertaining to exemplary implementations in the present disclosure. The drawings and their accompanying detailed disclosure are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

The following contains specific information pertaining to example implementations in the present disclosure. The drawings and their accompanying detailed disclosure are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure may include a particular feature, structure, or characteristic, but not every possible implementation of the present disclosure necessarily includes the particular feature, structure, or characteristic. Further, repeated use of the phrase "in one implementation," "in an example implementation," or "an implementation," do not necessarily refer to the same implementation, although they may. Moreover, any use of phrases like "implementations" in connection with "the present disclosure" are never meant to characterize that all implementations of the present disclosure must include the particular feature, structure, or characteristic, and should instead be understood to mean "at least some implementations of the present disclosure" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-disclosed combination, group, series, and the equivalent.

The term "and/or" herein is only an association relationship for describing associated objects, and represents that three relationships may exist, for example, A and/or B may represent that: A exists alone, A and B exist at the same time, and B exists alone. "A and/or B and/or C" may represent that at least one of A, B and C exists. In addition, the character "/" used herein generally represents that the former and latter associated objects are in an "or" relationship.

Additionally, for the purpose of non-limiting explanation, specific details, such as functional entities, techniques, protocols, standards, and the like, are set forth for providing an understanding of the disclosed technology. In other examples, a detailed disclosure of well-known methods, technologies, systems, architectures, and the like are omitted in order not to obscure the present disclosure with unnecessary details.

Persons skilled in the art will immediately recognize that any NW function(s) or algorithm(s) in the present disclosure may be implemented by hardware, software, or a combination of software and hardware. Disclosed functions may correspond to modules that may be software, hardware, firmware, or any combination thereof. The software implementation may comprise computer-executable instructions stored on computer-readable media such as memory or other types of storage devices. For example, one or more microprocessors or general-purpose computers with communication processing capability may be programmed with corresponding executable instructions and carry out the disclosed NW function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations in the present disclosure are directed to software installed and executing on computer hardware, alternative example implementations implemented as firmware or as hardware or combination of hardware and software are well within the scope of the present disclosure.

The computer-readable medium includes but is not limited to Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication NW architecture (e.g., a Long Term Evolution (LTE) system, an LTE-Advanced (LTE-A) system, or an LTE-Advanced Pro system) typically includes at least one Base Station (BS), at least one user equipment (UE), and one or more optional NW elements that provide connection towards an NW. The UE communicates with the NW (e.g., a Core NW (CN), an Evolved Packet Core (EPC) NW, an Evolved Universal Terrestrial Radio Access NW (E-UTRAN), a Next-Generation Core (NGC), or an Internet), through a Radio Access NW (RAN) established by the BS.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE is configured to receive and transmit signals over an air interface to one or more cells in a RAN.

A BS may include, but not limited to, a Node B (NB) as in the Universal Mobile Telecommunication System (UMTS), an evolved Node B (eNB) as in the LTE-A, a Radio NW Controller (RNC) as in the UMTS, a Base Station Controller (BSC) as in the Global System for Mobile communications (GSM)/GSM EDGE Radio Access NW (GERAN), a Next Generation eNB (ng-eNB) as in an E-UTRA BS in connection with the 5GC, a next-generation Node B (gNB) as in the 5G Access NW (5G-AN), and any other apparatus capable of controlling radio communication and managing radio resources within a cell. The BS may connect to serve the one or more UEs through a radio interface to the NW.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), and LTE-A Pro. However, the scope of the present disclosure should not be limited to the protocols previously disclosed.

The BS may be operable to provide radio coverage to a specific geographical area using a plurality of cells included in the RAN. The BS may support the operations of the cells. Each cell is operable to provide services to at least one UE within its radio coverage. More specifically, each cell (often referred to as a serving cell) may provide services to serve one or more UEs within its radio coverage, (e.g., each cell schedules the Downlink (DL) and optionally UL resources to at least one UE within its radio coverage for DL and optionally Uplink (UL) packet transmissions). The BS may communicate with one or more UEs in the radio communication system through the plurality of cells. A cell may allocate sidelink (SL) resources for supporting proximity service (ProSe). Each cell may have overlapped coverage areas with other cells. In Multi-RAT Dual Connectivity (MR-DC) cases, the primary cell of a Master Cell Group (MCG) or a Secondary Cell Group (SCG) may be called as a Special Cell (SpCell). A Primary Cell (PCell) may refer to the SpCell of an MCG. A PSCell may refer to the SpCell of an SCG. MCG refers to a group of serving cells associated with the Master Node (MN), comprising the SpCell and optionally one or more secondary cells (SCells). SCG refers to a group of serving cells associated with the Secondary Node (SN), comprising of the SpCell and optionally one or more SCells.

As previously disclosed, the frame structure for NR is to support flexible configurations for accommodating various next generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the $3^{rd}$ Generation Partnership Project (3GPP), may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or service applications.

Moreover, it is also considered that in a transmission time interval of a single NR frame, at least DL transmission data, a guard period, and UL transmission data should be included, where the respective portions of the DL transmission data, the guard period, the UL transmission data should also be configurable, for example, based on the NW dynamics of NR. In addition, SL resources may also be provided in an NR frame to support ProSe services.

An objective of the 5G on new radio access technology is to identify and develop technology components needed for new radio systems which should be able to use any spectrum band ranging at least up to 100 GHz. Supporting carrier frequencies up to 100 GHz brings several challenges in the area of radio propagation. As the carrier frequency increases, the path loss also increases.

In lower frequency bands (e.g., <6 GHz) the required cell coverage may be provided by forming a wide sector beam for transmitting downlink common channels. However, utilizing a wide sector beam on higher frequencies (e.g., >6 GHz) the cell coverage is reduced with the same antenna gain. To provide required cell coverage on higher frequency bands, higher antenna gain is needed to compensate for the increased path loss.

Beamforming is a signal processing technique used in antenna arrays for directional signal transmission/reception. With beamforming, a beam may be formed by combining elements in a phased array of antennas in such a way that signals at particular angles experience constructive interference while others experience destructive interference. Different beams may be utilized simultaneously using multiple arrays of antennas. To increase the antenna gain over a wide sector beam, larger antenna arrays (number of antenna elements ranging from tens to hundreds) are used to form high gain beams.

Nonetheless, the high gain beams are narrow compared to a wide sector beam so multiple beams for transmitting downlink common channels are needed to cover the required cell area. The number of concurrent high gain beams that an access point may form may be limited by the cost and complexity of the utilized transceiver architecture. In practice, on higher frequencies, the number of concurrent high gain beams is much less than the total number of beams required to cover the cell area. In other words, the access point may cover only part of the cell area by using a subset of beams at any given time.

As a consequence, the gNB may utilize multiple beams to cover the whole coverage area and each UE may be associated with one of those beams. When the UE moves and/or the environment varies, the best beam for the UE could change. Here the Layer 1 (L1)/Layer 2 (L2) beam management procedure is operated to switch the current beam to a new beam. That may be called L1/L2 inter-beam mobility. The beam may be used on the downlink control channel. The design of beams should consider both coverage distance and robustness to UE mobility. Considering the low data rate requirement but high reliability requirement on the control channel, the beam should be wide enough to allow reasonable UE mobility and potential blockage. Choosing narrow beams would generate unnecessary frequent beam switching and potentially frequent connection loss on the control channel.

On the other hand, the misalignment on the beam could result in the loss of an ongoing link of the control channel (which may be called beam failure). The gNB might not be able to use the same beam management procedure to switch to a new beam. Thus, a beam failure recovery (BFR) mechanism may be utilized. The UE may recognize a beam failure event based on measuring some downlink RSs, control channels and/or data channels. One example of beam failure recognition is that the UE detects very low reference symbol received power (RSRP) of the current serving beam based on the measurement of downlink RS used for beam management. If beam failure is recognized (or detected), the UE may notify the gNB of this event through some UL transmission. Then the gNB may act to recovery the beam accordingly. However, there is a need in the art to make the BFR procedure more efficient and better applied to the secondary cell (SCell). However, there is a need in the art to make the BFR procedure more efficient and better applied to the secondary cell (SCell).

Based on the previously disclosed issues, a UE may be configured with a BFR procedure which is used for indicating to the serving gNB of a new synchronization signal block (SSB) and/or channel status information-RS (CSI-RS) when beam failure is detected on the serving SSB(s)/CSI-RS(s). For beam failure detection, the gNB configures the UE with beam failure detection reference signals (SSB or CSI-RS) and the UE declares beam failure when the number of beam failure instance indications from the physical layer reaches a configured threshold before a configured timer expires. SSB-based Beam Failure Detection is based on the SSB associated with the initial DL Band Width Part (BWP) and may only be configured for the initial DL BWPs and for DL BWPs containing the SSB associated to the initial DL BWP. For other DL BWPs, Beam Failure Detection may only be performed based on CSI-RS.

When beam failure (on SpCell) is detected, the UE may perform a random-access channel-based (RACH-based) BFR procedure with the following steps:

triggering BFR by initiating a Random Access (RA) procedure on the SpCell; and/or selecting a suitable beam to perform BFR if the gNB has provided dedicated RA resources for certain beams, those will be prioritized by the UE.

Upon completion of the RA procedure, the BFR is considered complete.

The following may be used to further elaborate the term, example, embodiment, action, behavior, alternative, aspect, example, or claim mentioned in the present disclosure.

UE: The UE may be referred to as PHY/MAC/RLC/PDCP/SDAP entity. The PHY/MAC/RLC/PDCP/SDAP entity may refer to the UE.

NW: The NW may be a network node, a TRP, a cell (e.g., SpCell, PCell, PSCell, and/or SCell), an eNB, a gNB, and/or a base station.

Serving Cell: A PCell, a PSCell, or an SCell. The serving cell may be an activated or a deactivated serving cell.

SpCell: For DC operation the term Special Cell refers to the PCell of the MCG or the PSCell of the SCG depending on whether the MAC entity is associated with the MCG or the SCG, respectively. Otherwise, the term Special Cell refers to the PCell. A Special Cell supports PUCCH transmission and contention-based RA and is always activated.

Component Carrier (CC): The CC may be a PCell, PSCell, and/or SCell.

UL resource: The UL resource may be a RACH resource, PUCCH resource, and/or PUSCH resource. The UL resource may be scheduled by a dynamic grant (e.g., via PDCCH) and/or configured by the RRC (e.g., type 1/type 2 configured UL grant or pre-configured in RRC configuration).

BFR procedure: The BFR procedure may be the SCell BFR procedure and/or the RACH-based BFR procedure.

RACH-based BFR procedure: The RACH-based BFR procedure may be performed based on contention-free RA procedure and/or contention-based RA procedure. The RACH-based BFR procedure is initiated when the corresponding RA procedure is initiated. The RACH-based BFR procedure is ongoing when the corresponding RA procedure is ongoing. The RACH-based BFR procedure is stopped when the corresponding RA procedure is stopped. The RACH-based BFR procedure is completed when the corresponding RA procedure is completed.

SCell BFR procedure: The SCell BFR procedure may be performed based on the BFR-SR and/or the BFR MAC CE.

Beam: The term "beam" may be replaced by a spatial filter. For example, when the UE reports a preferred gNB TX beam, the UE is essentially selecting a spatial filter used by the gNB. The term "beam information" is used to provide information about which beam/spatial filter is being used/selected. In one example, individual reference signals are transmitted by applying individual beams (spatial filters). Thus, the beam or the beam information may be represented by the reference signal resource index(es). The beam may be a DL and/or UL beam. The beam may be a Tx beam and/or Rx beam. The beam may be a UE beam and/or NW beam. The beam may be referred to as a reference signal (e.g., SSB, CSI-RS, and/or SRS), and/or TCI state. The (new) beam may be indicated via a reference signal (e.g., SSB, CSI-RS, and/or SRS), and/or a TCI state.

Serving beam: The serving beam for the UE is a beam generated by network, e.g. TRP, which is used to communicate with the UE, e.g. for transmission and/or reception.

The BFR-SR of SCell BFR mentioned in the present disclosure may be replaced by a PRACH transmission. For example, the UE may perform the PRACH transmission (e.g., transmits preamble) to request a UL resource for the BFR MAC CE.

The BFR MAC CE of SCell BFR mentioned in the present disclosure may be replaced by transmitting an Uplink Control Information (UCI). For example, the BFR-related information (e.g., (failed) CC (or cell) information (e.g., cell index), (failed) set/group(s) of cells (e.g., the set/group may be pre-configured by NW), (failed) transmission and reception point (TRP) information, the corresponding measurement result (e.g., RSRP, Signal to Interference plus Noise Ratio (SINR), etc.) of the (failed) CC, set/group of cells, TRP, Candidate beam information (or new beam information), e.g., one or more qualified beam based on measuring NBI RS, no new beam information (e.g., if there is no new beam with RSRP higher than a threshold for the (failed) CC, set/group of cells, TRP, etc. may be included in the UCI.

For the NW side, the NW may have multiple TRPs (either centralized or distributed). Each TRP may form multiple beams for transmission or reception. The number of beams and the number of simultaneous beams in the time/frequency domain may depend on the number of antenna array elements and the RF at the TRP. The TRP may apply a beamforming to both data and control signaling transmission or reception. Number of beams generated concurrently by TRP depends on TRP capability, e.g. maximum number of beams generated concurrently by different TRPs in the same cell may be the same and those in different cells may be different. Beam sweeping may be necessary, e.g. for the control signaling to be provided in every direction.

The UE may perform the beamforming for transmission or reception. The UE may generate multiple UE beams concurrently and to be served by multiple serving beams from one or multiple TRPs of the same cell. Same or different (DL or UL) data could be transmitted on the same radio resource via different beams for diversity or throughput gain.

In one embodiment (e.g. the spec as defined for Rel-15), the RACH-based BFR mechanism is only applied for the special cell (SpCell), e.g., the primary cell (PCell) and the primary secondary cell (PSCell). If beam blockage happens on an SCell, the only option is to rely on a network (NW) to handle it, e.g., the SCell beam failure detection could be based either on the absence of an acknowledgment (ACK)/non-ACK (HACK) feedback for the scheduled DL transmission in the SCell or depending on a Channel Quality Indicator (CQI) report in the SCell. If the beam failure occurs, the NW may release this SCell and re-schedule the data transmission. Under such circumstances, this implementation may degrade scheduling efficiency and increase the higher layers signaling propagation latency. In order to quickly recover the beam (e.g., changing the serving beam) from the beam failure on the SCell, in another embodiment (e.g. the spec as defined for the Rel-16), the detailed signaling configuration and/or the BFR procedure is discussed and determined to support the SCell BFR.

FIG. 1 illustrates a SCell BFR procedure 10 according to an example implementation of the present disclosure. As illustrated in FIG. 1, the SCell BFR procedure 10 includes the following steps.

Step 102 of the SCell BFR procedure 10 performs a beam failure detection (BFD) by a UE 182. Specifically, a BFD RS (e.g., SSB and/or CSI-RS) may be explicitly or implicitly configured for the UE to detect any beam failure (event). When the BFD RS is configured implicitly, the BFD RS may be transmitted in active BWP of either a current CC or another CC.

In one aspect of the embodiments, considering the physical layer of the UE, the UE may assess the radio link quality according to the BFD RS. The UE may indicate a BFI indication to a higher layer (e.g. the MAC layer) when the radio link quality is lower than a first threshold (e.g., a RSRP threshold for the BFD RS) with a periodicity. The UE may increment a value of the BFI counter based on the previously disclosed Beam Failure Detection (BFD).

In one aspect of the embodiments, considering the MAC layer of UE, the UE may receive the BFI indication from a lower layer (e.g. the physical layer). The Beam failure (event) is determined/detected when the value of the BFI counter is equal to or higher than a second threshold. For example, if the incremented value of the BFI counter exceeds the second threshold (e.g. a configured maximum number, specifically the beamfailureInstanceMaxCount information element (IE)), the BFR procedure for the serving cell may be triggered. One beamfailureInstanceMaxCount IE may be configured for each serving cell. In other words, the BFI counter may be used for counting the number of BFI(s), specifically BFI_COUNTER, such that the BFI_COUNTER may be used for each serving cell.

In one aspect of the embodiments, the UE may implement a BFD timer that resets the BFI counter upon expiration, specifically beamFailureDetectionTimer. The beamFailureDetectionTimer may be configured for each serving cell.

Accordingly, as previously disclosed, when the beam failure associated with at least one serving cell (e.g., SCell) is detected, UE may trigger the BFR procedure for the serving cell (e.g., SCell) and/or trigger a dedicated scheduling request (SR)-like PUCCH resource for a BFR request (BFRQ), which may be introduced as a BFR-SR procedure in the following disclosure.

Step 104 of the SCell BFR procedure 10 performs an NBI by the UE 182.

In one aspect of the embodiments, the UE may select a new beam or a candidate beam for the serving cell(s) based on measuring an NBI RS. For example, the UE may determine whether an L1-RSRP measurement result is higher than a predefined threshold or not.

Next, a downlink RS for the NBI may be transmitted in an active BWP of the CC which is configured to be monitored for the same BFR or another CC within the same band of the serving cell (e.g., SCell).

The UE may expect the gNB to configure at least one new beam RS if the BFR for the corresponding serving cell (e.g., SCell) is configured. If at least one new beam RS is not configured, all SSBs may be considered as new beam RS candidates.

For the BFR, each BWP of a serving cell (e.g., SCell) may support a maximum number of 64 RS for new beam identification.

Step 106 of the SCell BFR procedure 10 performs a BFRQ by the UE 182.

In the BFRQ, the UE may send a BFR-SR over a PCell, a PSCell, and/or a SCell, and the BFR-SR may be used to indicate a beam failure event of an CC (s) and/or to request an UL resource in order to transmit more information related to beam failure. It is noted that whether the first step should be performed may be based on whether any UL resource(s) is available. Specifically, the BFR-SR may be skipped if the UL resource is available and/or could be used for a BFR report (e.g., BFR MAC CE) transmission. It is noted that when the UE determines not to perform (or to skip) the BFR-SR, the UE may (directly) send a BFRQ MAC CE.

In the BFRQ, the UE may send a BFR MAC CE. In one aspect of the embodiments, the BFR MAC CE may include at least one of the following information:
- a failed-CC(s) information (e.g., cell index);
- a new-beam(s) information (e.g., the new beam may be selected based on measuring NBI RS);
- a no-new-beam information (e.g., no new beam with L1-RSRP higher than a threshold);
- a cell identity of the serving cell which triggers the BFR procedure;
- a beam-presence indicator of the serving cell which triggers the BFR procedure;
- a candidate beam indicator of the serving cell which triggers the BFR procedure.

The BFR MAC CE may be transmitted (only) via the UL grant which is requested by the BFR-SR. Alternatively, the BFR MAC CE may also be transmitted via any UL grant (e.g., UL grant via RAR, dynamic UL grant via a physical downlink control channel (PDCCH), and/or configured grant), which is not limited the scope of the embodiments.

Step 108 of the SCell BFR procedure 10 is the NW transmitting a BFR response (BFRR).

In one aspect of the embodiments, after the UE transmits the BFRQ (e.g., the BFR-SR and/or the BFR MAC CE), the UE may try to monitor a BFRR (e.g., via PDCCH monitoring) from the NW (i.e. the BFRR is received from the PDCCH of the serving cell).

In one aspect of the embodiments, the BFRR may be transmitted, from the NW, on the PCell, the PSCell and/or the SCell. The BFRR may be transmitted, from the NW, on an CC, where the UE transmits the BFRQ on the CC. The BFRR may be transmitted, from the NW, on another CC, which is not the same as the CC on which the UE transmits the BFRQ, e.g., via cross carrier scheduling.

In one aspect of the embodiments, the BFRR may be an UL grant scrambled with/addressed to a cell-radio network temporary identifier (C-RNTI)/modulation coding scheme (MCS)-C-RNTI.

In one aspect of the embodiments, the BFRR may schedule a new transmission for the same Hybrid Automatic Repeat Request (HARQ) process as a physical uplink shared channel (PUSCH) carrying the BFR MAC CE.

Accordingly, upon receiving the BFRR, the UE may consider the BFR procedure is successfully completed. More detailed terminology and/or definition may be disclosed hereinafter.

In one embodiment, the BFD RS may be a set of reference signals (e.g., SSB and/or CSI-RS) which may be used for the BFD. Different sets of the BFD RSs may be associated with different serving cell/CC (or cell)s, sets/groups of cells, or TRPs. In one embodiment, assume a first set of the BFD RSs is associated with a first serving cell/CC. If the UE detects that the quality of the first set of the BFD RSs are all lower than a threshold for a period, the UE may detect that the first serving cell/CC has failed (or beam failure has occurred). The BFD RS may be transmitted in (active BWP of) either a current serving cell/CC or another serving cell/CC (e.g., within the same band).

In one embodiment, the NBI RS may be a set of reference signals (e.g., SSB and/or CSI-RS) which may be used for the NBI. Different sets of the NBI RSs may be configured for different serving cell/CCs, sets/groups of cells, or TRPs. In one embodiment, assume a first set of the NBI RS is configured for a first serving cell/CC. If beam failure occurs in the first serving cell/CC, the UE may select a new beam based on measuring the first set of the NBI RSs. The UE may select a new beam which has the highest RSRP or has a RSRP higher than a threshold within the first set of the NBI RS. The UE may include the information of the NBI RS in the BFR report (e.g., BFR MAC CE). The NBI RS may be transmitted in (active BWP of) the serving cell/CC which is configured to be monitored for BFR or another serving cell/CC within the same band.

In one embodiment, the SR may be used for requesting an uplink shared channel (UL-SCH) resource (e.g., PUSCH resource) for a new transmission. The UE may be configured with zero, one, or more SR configurations. An SR configuration may consist of a set of PUCCH resources for the SR across different BWPs and cells. For a logical channel, at most one PUCCH resource for the SR is configured per BWP. Each SR configuration may correspond to one or more logical channels. Each logical channel may be mapped to zero or one SR configuration. The SR configuration of the logical channel that triggered a buffer status report (BSR) (if such a configuration exists) is considered as the corresponding SR configuration for the triggered SR. When the SR is triggered, the SR shall be considered as pending until it is cancelled.

In one embodiment, the BFR-SR may be a BFRQ. The BFR-SR may be a dedicated SR-like PUCCH resource for BFR. The BFR-SR may be used to indicate to the NW a beam failure event and/or used for requesting a UL-SCH resource (e.g., for a BFR MAC CE transmission). The UE may be configured with zero, one, or more BFR-SR configuration. The PUCCH resource for the BFR-SR may be configured per BWP, per TRP, per serving cell/CC, per set of CCs, per CG, and/or per UE. The PUCCH resource for the BFR-SR may be configured on the PCell, the PSCell, and/or the (PUCCH) SCell. The BFR-SR may be transmitted on the PCell, the PSCell, and/or the SCell accordingly. The BFR-SR may be a cross-cell transmission, e.g., the beam failure happens on an SCell, but the BFR-SR is transmitted on the PCell. The BFR-SR configuration may be a specific configuration which may not be one of the SR configurations, e.g., the identification (ID) of BFR-SR configuration is not indicated by schedulingRequestid. Alternatively, the BFR-SR configuration may be one of the SR configurations, e.g., the ID of the BFR-SR configuration is indicated by schedulingRequestid. A radio resource control (RRC) parameter may be used to indicate which SR configuration corresponds to the BFR-SR. The ID of the BFR-SR configuration may be configured per BWP, e.g., as a part of BFR configuration. The BFR-SR may have the highest priority of all the SR procedures applying legacy SR configurations. The BFR-SR configuration may be configured per BWP, per TRP, per serving cell/CC, per set of CCs, per cell group (CG), and/or per UE.

In one embodiment, the BFR MAC CE may be a BFRQ. The BFR MAC CE may be transmitted on any available UL grant which could accommodate the BFR MAC CE. Alternatively, the BFR MAC CE may (only) be transmitted on a specific UL grant which is requested by the BFR-SR. Preferably, whether the specific UL grant is requested by BFR-SR or not may be indicated based on one implicit or explicit method. In one embodiment, the BFR MAC CE may be transmitted on a physical uplink shared channel (PUSCH). Alternatively, in another embodiment, the BFR MAC CE may be transmitted on any UL grant (e.g., the UL grant provided by random access response (RAR), type1/type 2 configured grant, dynamic grant, etc.). In some of the embodiments, the BFR MAC CE may include one or more of the following information:
- (failed) CC (or cell) information (e.g., the cell index of the serving cell);
- (failed) set/group(s) of cells (e.g., the set/group may be pre-configured by the NW);
- (failed) TRP information;
- the corresponding measurement result (e.g., RSRP, SINR, etc.) of the (failed) CC, set/group of cells, TRP;
- candidate beam information/indicator (or new beam information) (e.g., one or more qualified beam(s) based on measuring the NBI RS);
- beam-presence information/indicator;
- no new beam information (e.g., if there is no new beam with RSRP higher than a threshold for the (failed) CC, set/group of cells, TRP).

In one embodiment, multiple serving cells (e.g., PCell and/or SCells) may fail simultaneously, and the BFR MAC CE may carry multiple failed serving cell (e.g., PCell and/or SCell) information. In another embodiment, if there is only one failed SCell, one failed SCell information is included in the BFR MAC CE. Two formats of the BFR MAC CE including a single-entry MAC-CE and/or a multi-entry MAC-CE for carrying the information of the failed SCell may be introduced. The UE may transmit the corresponding BFRQ information via the single-entry BFFQ MAC CE when beam failure happens (e.g., on only one serving cell) and/or transmit the corresponding BFRQ information via the multi-entry BFR MAC CE when beam failure occurs on multiple serving cells (e.g., PCell and/or SCells).

Figure 2:
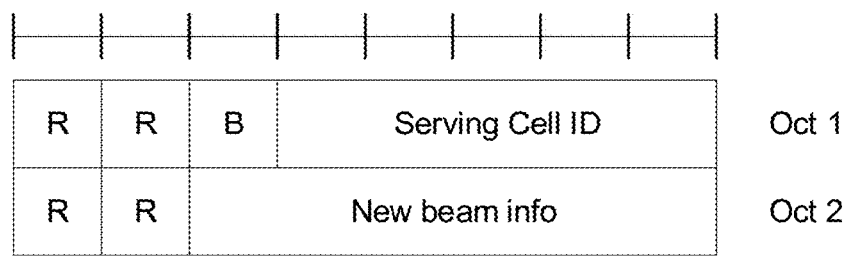
FIG. 2 illustrates a single-entry BFR Medium Access Control (MAC) Control Element (CE) according to an example implementation of the present disclosure.
Figure 3:
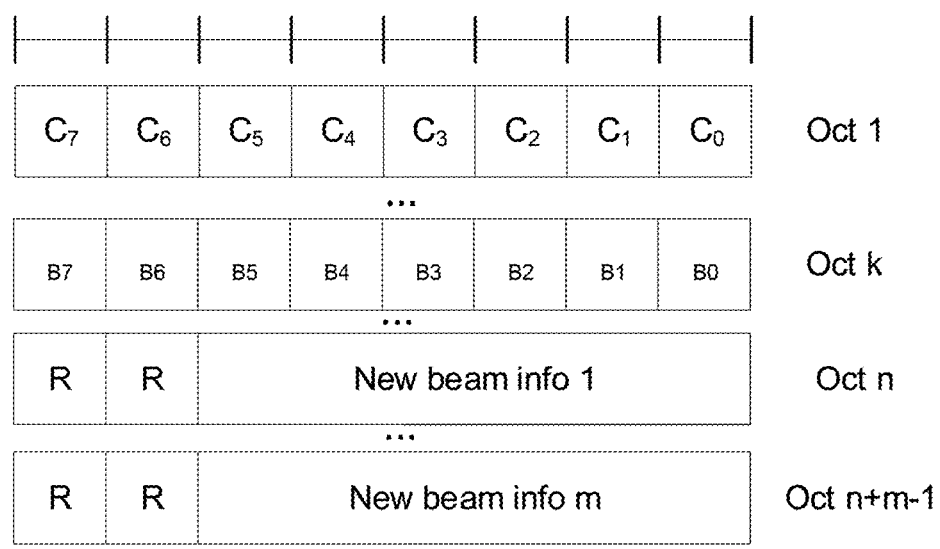
FIG. 3 illustrates a multi-entry BFR MAC CE according to an example implementation of the present disclosure.

FIG. 2 and FIG. 3 provide clarification. FIG. 2 illustrates a single-entry BFR MAC CE 20 according to an example implementation of the present disclosure, and FIG. 3 illustrates a multi-entry BFR MAC CE 30 according to an example implementation of the present disclosure. As illustrated in FIG. 2 and FIG. 3, the BFR MAC CE may include at least one of the following fields:
- a serving Cell ID field that indicates which serving cells failed;
- a 'B' field that indicates whether the new beam information corresponds to the identified failed serving cell;
- a new beam info field that indicates the CSI-RS or SSB with the L1-RSRP higher than the threshold configured for the BFR.

In one embodiment, for the multi-entry BFR MAC CE, multiple failed serving cell indexes may be indicated by a bitmap, where each bit corresponds to one serving cell.

BWP Switching During BFR Procedure

In some of the embodiments, for the BFR mechanism, the UE may be configured with a (set of) BFD RS for the BFD and may be configured with a (set of) NBI RS for the NBI. It is noted that the BFD RS and/or the NBI RS may be configured per (DL) BWP. In one embodiment, the configuration of the BFD RS and/or the NBI RS may be configured in a BWP configuration (e.g., BWP-DownlinkDedicated). In other words, each BWP of a cell may have different (set of) BFD RSs and/or different (set of) NBI RSs. For the BFD, the UE may assess the radio link quality associated with the BFD according to the BFD RS of an active BWP of a cell. For example, the UE may count the number of BFIs when the quality of the BFD RS is worse than a threshold during a period of time. If the number of BFI reaches a maximum number (e.g., a threshold) the UE may consider the cell where the BFD RS is configured has detected a beam failure. Furthermore, when beam failure is detected on the cell, the UE may need to find a new beam (or a candidate beam) based on the (set of) NBI RSs configured for the active BWP of the cell. For the SCell BFR procedure 10 illustrated in FIG. 1, the UE may report the new beam information via the second step of the BFRQ, e.g., to carry the NBI RS index in the BFR MAC CE.

In some of the embodiments, the UE may switch the BWP of a cell during the BFR procedure for the cell. Under such circumstances, the UE may receive an indication (e.g., an RRC or a PDCCH signaling) for a BWP switching of the cell from the NW during any time point of the BFR procedure for the cell. In another embodiment, the UE may also switch the BWP of the cell due to expiration of a bwp-Inactivity Timer of the cell during the BFR procedure for the cell. FIG.

Figure 4:
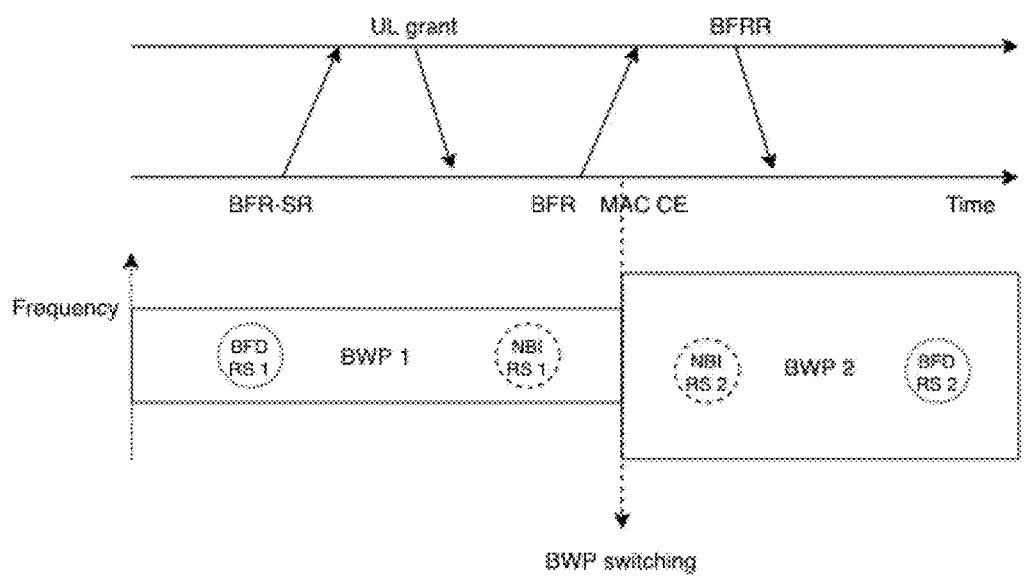
FIG. 4 illustrates a BWP switching during the BFR procedure according to an example implementation of the present disclosure.

4 illustrates a BWP switching during the BFR procedure 40 according to an example implementation of the present disclosure. As illustrated in FIG. 4, some issues may be introduced. For example, the NW may not be aware of whether the new beam information included in the BFR MAC CE is measured on the BWP before the BWP switching or after the BWP switching. If the BWP switching is performed after transmitting the BFR MAC CE or after generating the BFR MAC CE, the new beam information included in the BFR MAC CE may be invalid because the UE has changed to another BWP with different channel condition(s). Accordingly, one or more or any combination of the disclosed alternatives, aspects, examples, and/or embodiments may be taken into account to resolve such issues.

BWP (if defaultDownlinkBWP-Id is configured) or an initial BWP (which is indicated by initialDownlinkBWP).

RRC Signaling

Upon performing RRC (re-)configuration, a firstActiveDownlinkBWP IE contains the ID of the DL BWP to be activated. If the ID of the DL BWP (e.g., firstActiveDownlinkBWP-Id) is absent, the RRC (re-)configuration does not impose a BWP switch. Upon performing RRC (re-)configuration, the firstActiveUplinkBWP IE contains the ID of the UL BWP to be activated. If the ID of the UL BWP (e.g., firstActiveDownlinkBWP-Id) is absent, the RRC (re-)configuration does not impose a BWP switch.

Upon Initiation of Random Access (RA) Procedure

Upon initiation of the RA procedure on a serving cell, the UE may:

```
1>  if PRACH occasions are not configured for the active UL BWP:
      2>  switch the active UL BWP to BWP indicated by initialUplinkBWP;
      2>  if the Serving Cell is a SpCell:
            3>  switch the active DL BWP to BWP indicated by
initialDownlinkBWP.
1>  else:
      2>  if the Serving Cell is a SpCell:
            3>  if the active DL BWP does not have the same bwp-Id as the active
UL BWP:
                  4>  switch the active DL BWP to the DL BWP with the same
bwp-Id as the active UL BWP.
```

In one embodiment, the UE may switch the BWP of a cell (e.g., when the UE receives an indication for the BWP switching or when the bwp-InactivityTimer of the cell expires) during the BFR procedure for the cell. The UE may (only) perform the BWP switching if the UE has not transmitted the BFR MAC CE during the BFR procedure. The UE may not perform the BWP switching if the UE has transmitted the BFR MAC CE during the BFR procedure.

BWP Switching

In one embodiment, the UE may or may not perform BWP switching when the UE receives a signaling, and the signaling includes BWP information. For example, if the BWP information is different from the active (DL) BWP of the UE, the UE may perform BWP switching to the BWP indicated by the signaling. If the BWP information is the same as the active (DL) BWP of the UE, the UE may not perform BWP switching. The UE may determine to start or restart the bwp-InactivityTimer of a cell based on whether the UE performs BWP switching of the cell. If the UE performs BWP switching of a cell, the UE may start or restart the bwp-Inactivity Timer of the cell. If the UE does not perform BWP switching of a cell, the UE may not start or restart the bwp-InactivityTimer of the cell. The duration of the bwp-InactivityTimer is in milliseconds (ms) after which the UE reverts to the default Bandwidth Part. A value 0.5 ms is only applicable for carriers >6 GHz. When the network releases the timer configuration, the UE stops the bwp-Inactivity Timer without switching to the default BWP.

In one embodiment, the BWP switching may be controlled by the following one or more programming code(s).

PDCCH Indicating a DL Assignment or an UL Grant

If the UE receives the PDCCH for the BWP switching of a serving cell, the UE may perform the BWP switching to a BWP indicated by the PDCCH (e.g., the PDCCH may include a BWP ID which is different from the current active BWP of the UE).

bwp-InactivityTimer

If the bwp-Inactivity Timer associated with the DL BWP expires, the UE may perform the BWP switching to a default Upon Reception of a Wake-Up Signal (WUS) Signaling (e.g., DCI Forma 2_6), to Indicate the BWP Switch.

The UE may apply one or more or any combination of the following behaviors (e.g., if the UE switches the BWP of the cell (e.g., when the UE is performing the BFR procedure for the cell)).

In some of the embodiments, the UE may cancel or stop the (ongoing) BFR procedure for the cell in a case that the UE switches the BWP of the cell when the UE is performing the BFR procedure for the cell.

In one embodiment, the UE may initiate the BFR procedure for the cell(s) when the beam failure is detected (e.g., when the BFI counter for the cell reaches the BFI maximum count, i.e. the beamFailureInstanceMaxCount IE) on the cell. When the BFR procedure is ongoing, the UE may receive an indication (e.g., via PDCCH indicating a DL assignment, PDCCH indicating a UL grant, or via an RRC (re-)configuration), from the NW, to instruct the UE to switch the BWP of the cell. The UE may cancel or stop the BFR procedure for the cell if the UE switches the BWP of the cell based on the indication.

In one embodiment, the UE may initiate the BFR procedure for the cell(s) when the beam failure is detected (e.g., when the BFI counter for the cell reaches the BFI maximum count, i.e. the beamFailureInstanceMaxCount IE) on the cell. When the BFR procedure is ongoing, the UE may switch the BWP (e.g., to initial/default BWP) of the cell if a BWP inactivity timer for the cell expires. The UE may cancel or stop the BFR procedure for the cell if the UE switches the BWP of the cell when the BWP inactivity timer expires.

In one embodiment, the UE may initiate the BFR procedure for the cell(s) when the beam failure is detected (e.g., when the BFI counter for the cell reaches the BFI maximum count, i.e. the beamFailureInstanceMaxCount IE) on the cell when the UE is performing the RA procedure. When the BFR procedure is ongoing, the UE may switch the BWP (e.g., to initial/default BWP) of the cell during the RA procedure. In one embodiment, the UE may switch an UL BWP to another BWP indicated by the initialUplinkBWP if PRACH occasions are not configured for the UE's active UL BWP during the RA procedure. The UE may cancel or stop the BFR procedure for the cell if the UE switches the BWP of the cell during the RA procedure.

In one embodiment, the UE may initiate the BFR procedure for the cell(s) when the beam failure is detected (e.g., when the BFI counter for the cell reaches the BFI maximum count, i.e. the beamFailureInstanceMaxCount IE) on the cell. When the BFR procedure is ongoing, the UE may receive the PDCCH for the BWP switching from the gNB. The PDCCH may instruct the UE to switch the BWP of the cell. The UE may cancel or stop the BFR procedure for the cell if the UE switches the BWP of the SCell based on the instruction. Alternatively, the UE maintains the triggered BFR procedure if the UE ignores a BWP switching instruction.

In one embodiment, if the BFR procedure is successfully completed upon reception of the PDCCH for the BWP switching (e.g., the UE receives the BFRR indicating the BWP switching) of the serving cell, the UE may perform the BWP switching indicated by the PDCCH.

In some of the embodiments, the UE may cancel the (triggered) BFR MAC CE (by reporting or generating a procedure thereof) for the cell if the UE switches the BWP of the cell when the UE is performing the BFR procedure for the cell.

In one embodiment, the UE may trigger the BFR MAC CE (by reporting or generating a procedure thereof) for the cell(s) when the beam failure is detected (e.g., when the BFI counter for the cell reaches the BFI maximum count, i.e. the beamFailureInstanceMaxCount IE) on the cell. When the BFR MAC CE has not been canceled, the UE may receive an indication, from the NW, to instruct the UE to switch the BWP of the cell. The UE may cancel the triggered BFR MAC CE if the UE switches BWP of the cell based on the indication (e.g., the UE may not generate the BFR MAC CE).

In one embodiment, the UE may trigger the BFR MAC CE (and/or the corresponding procedure) for a cell(s) when the beam failure is detected (e.g., when the BFI counter for the cell reaches the BFI maximum count, i.e. the beamFailureInstanceMaxCount IE) on the cell. When the BFR MAC CE has not been canceled, the UE may switch the BWP (e.g., to initial/default BWP) of the cell if the BWP inactivity timer for the cell expires. The UE may cancel the triggered BFR MAC CE if the UE switches the BWP of the cell when the BWP inactivity timer expires (e.g., the UE may not generate the BFR MAC CE).

In some of the embodiments, the UE may cancel the pending BFR-SR (for the cell) if the UE switches the BWP of the cell when the UE is performing the BFR procedure for the cell.

In one embodiment, the UE may trigger the BFR-SR when the beam failure is detected (e.g., when the BFI counter for the cell reaches the BFI maximum count, i.e. the beamFailureInstanceMaxCount IE) on the cell. When the BFR-SR is pending, the UE may receive the indication, from the NW, to instruct the UE to switch the BWP of the cell. The UE may cancel the pending BFR-SR if the UE switches the BWP of the cell based on the indication.

In one embodiment, the UE may trigger the BFR-SR when the beam failure is detected (e.g., when the BFI counter for the cell reaches the BFI maximum count, i.e. the beamFailureInstanceMaxCount IE) on the cell. When the BFR-SR is pending, the UE may switch BWP (e.g., to initial/default BWP) of the cell if the BWP inactivity timer for the cell expires. The UE may cancel the pending BFR-SR if the UE switches the BWP of the cell when the BWP inactivity timer expires.

In some of the embodiments, the UE may reset a counter for BFI indication (e.g., BFI counter) if the UE switches the BWP of the cell (e.g., activates an inactive BWP of the cell and deactivates an active BWP of the cell). Resetting the counter sets the value of the counter to zero.

In one embodiment, the UE may receive the indication, from the NW, to instruct the UE to switch the BWP of the cell. The UE may reset the counter for the BFI indication for the cell if the UE switches the BWP of the cell based on the indication.

In one embodiment, the UE may switch the BWP (e.g., to initial/default BWP) of the SCell if the BWP inactivity timer for the cell expires. The UE may reset the counter for the BFI indication for the cell if the UE switches the BWP of the cell when the BWP inactivity timer for the cell expires.

In some of the embodiments, the UE may reset the counter for the BFI indication in one or more of the following scenarios.

In one embodiment, the UE may reset the counter for the beam failure instance indication (e.g., BFI counter) for the cell if the UE initiates the BFR procedure for the cell.

In one embodiment, the UE may reset the counter for the BFI indication (e.g., BFI counter) for the cell if the UE triggers the BFR-SR.

In one embodiment, the UE may reset the counter for the BFI indication (e.g., BFI counter) for the cell if the UE triggers the BFR MAC CE (reporting procedure).

In one embodiment, the UE may reset the counter for the BFI indication (e.g., BFI counter) for the cell if the UE instructs the Multiplexing and Assembly procedure to generate the BFR MAC CE.

In one embodiment, the UE may reset the counter for the BFI indication (e.g., BFI counter) for a cell if the UE receives the BFR response (BFRR) for the cell from the NW.

In one embodiment, the UE may reset the counter for the BFI indication (e.g., BFI counter) for the cell if the UE considers the BFR procedure for the cell is successfully completed.

In one embodiment, the UE may reset the counter for the BFI indication (e.g., BFI counter) for the cell if the UE considers the BFR procedure for the cell has failed.

In one embodiment, the UE may reset the counter for the BFI indication (e.g., BFI counter) for the cell when the cell is deactivated, e.g., if the UE receives an associated Cell Activation/Deactivation MAC CE to deactivate the cell and/or when a Scell deactivation timer for the cell expires.

In one embodiment, the UE may reset the counter for the BFI indication (e.g., BFI counter) for the cell if the UE receives a DL RRC message which (re)configures the (SCell) BFR corresponding configuration (e.g., the beamFailureDetectionTimer, the beamFailureInstanceMaxCount, or any of the reference signals used for beam failure detection).

In some of the embodiments, the UE may include BWP information (e.g., BWP index) in the BFR MAC CE. For example, when generating the BFR MAC CE. The BWP information may be the active BWP of the UE when the UE generates the BFR MAC CE. The new beam information included in the BFR MAC CE may be associated with the BWP information included in the BFR MAC CE. For example, the NBI RS(s) is configured under the corresponding BWP configuration.

In one embodiment, the BFR MAC CE may have a field (e.g., 2 bits) for a BWP ID indication. The filed may indicate the DL/UL BWP of the new beam information included in the BFR MAC CE.

In some of the embodiments, the UE may trigger a measurement of the NBI RS on the new BWP if the UE switches the BWP of the cell to the new BWP of the cell.

In some of the embodiments, the UE may consider the BFR procedure for the cell is successfully completed if the UE switches the BWP of the cell when the UE is performing the BFR procedure for the cell.

In some of the embodiments, the UE may consider the BFR procedure for the cell is not successful if the UE switches the BWP of the cell when the UE is performing the BFR procedure for the cell.

In some of the embodiments, while receiving the BWP switching indication for a cell or when the BWP inactivity timer for the cell expires, the UE will send the BFR MAC CE via a new switched BWP of the cell. For example, if the BFR occurs on an active BWP of a cell, the UE may trigger a BFR procedure for the cell. During the BFR procedure the UE may receive a BWP switching indication for the cell, the UE will perform the BWP switching first and then transmit the BFR MAC CE on the new switched BWP of the cell.

In some of the embodiments, after the BFR of the serving cell is triggered or initiated, if the BFR procedure is successfully completed upon (or based on) reception of the PDCCH for the BWP switching of the serving cell, the UE performs the BWP switching indicated by the PDCCH.

In some of the embodiments, after the BFR of the serving cell is triggered or initiated, if the UE receives the PDCCH indicating PUSCH transmission on another UL BWP (which is not the current active UL BWP), and the indicated PUSCH transmission corresponds to the BFR-SR transmission, the UE may perform the UL BWP switching indicated by the PDCCH. That is, the PUSCH resource was granted by the gNB for the response of the BFR-SR reception.

In some of the embodiments, the UE may not switch the BWP of the cell (e.g., when receiving an indication from the NW to instruct the UE to switch the BWP of the cell, or when the bwp-InactivityTimer of the cell expires) during the BFR procedure for the cell.

In some of the embodiments, the UE may ignore an indication, received from the NW, for the BWP switching of the cell if the indication is received during the BFR procedure for the cell.

In one embodiment, the UE may initiate the BFR procedure for the cell(s) when the beam failure is detected on the cell. When the BFR procedure is ongoing, the UE may receive an indication, from the NW, to instruct the UE to switch the BWP of the cell. The UE may ignore the indication when the BFR procedure is ongoing.

In some of the embodiments, if the BFRR for the cell is received during the BFR procedure, where the BFRR is to indicate the success of the BFR MAC CE transmission or the success of the BFR procedure, and the BFRR indicates the BWP switching, the UE may (consider the BFR procedure is successfully completed and) switch the BWP based on the BFRR.

In one embodiment, when the UE is performing the BFR procedure for the cell, the UE may receive a first PDCCH to indicate the BWP switching for the cell, where the first PDCCH is not the BFRR for the cell. The UE may not switch the BWP based on the first PDCCH. In another embodiment, when the UE is performing the BFR procedure for the cell, the UE may receive a second PDCCH, which is different from the first PDCCH, to indicate the BWP switching for the cell, where the second PDCCH is the BFRR for the cell. The UE may switch the BWP based on the second PDCCH.

In one embodiment, after the UE transmits the BFR MAC CE for the cell, the UE may receive the first PDCCH to indicate the BWP switching for the cell, where the first PDCCH is not the BFRR for the cell. The UE may not switch the BWP based on the first PDCCH. In another embodiment, after the UE transmits the BFR MAC CE for the cell, the UE may receive the second PDCCH to indicate the BWP switching for the cell, where the second PDCCH is the BFRR for the cell. The UE may switch the BWP based on the second PDCCH.

In some of the embodiments, the UE may stop the bwp-InactivityTimer of the cell when the beam failure is detected on the cell. In some of the embodiments, the UE may stop the bwp-InactivityTimer of the cell when the BFR procedure for the cell is initiated. In some of the embodiments, the UE may stop the bwp-Inactivity Timer of the cell when the BFR-SR is triggered or transmitted. In some of the embodiments, the UE may stop the bwp-InactivityTimer of the cell when the BFR MAC CE is triggered or transmitted.

In some of the embodiments, the UE may (re-)start the bwp-Inactivity Timer of the cell when the BFR procedure for the cell is completed. In some of the embodiments, the UE may (re-)start the bwp-InactivityTimer of the cell when the BFRR for the cell is received.

In one embodiment, the UE may measure the BFD RS(s) which is associated with the cell. The UE may detect the beam failure on the cell based on the BFR RS(s) measurement. The UE may initiate the BFR procedure for the cell when the beam failure is detected on the cell. The UE may trigger the BFR-SR when the beam failure is detected on the cell. The UE may trigger the BFR MAC CE when the beam failure is detected on the cell. The UE may consider the BFR procedure for the cell is successfully completed when receiving the BFRR. The UE may stop the bwp-Inactivity-Timer for the cell based on whether the beam failure is detected on the cell, based on whether the BFR-SR is triggered, based on whether the BFR MAC CE is triggered, based on whether the BFR-SR is transmitted, and/or based on whether the BFR MAC CE is transmitted. The UE may start or restart the bwp-InactivityTimer for the cell based on whether the BFR procedure for the cell is completed, and/or based on whether receiving the BFRR.

More specifically, the UE may trigger the BFR MAC CE to instruct the Multiplexing and Assembly procedure, in order to generate the BFR MAC CE (e.g., if UL-SCH resources are available for a new transmission and the UL-SCH resources accommodate the BFR MAC CE as well as its sub-header).

In some of the embodiments, the UE may initiate the BFR procedure for the cell(s) when the beam failure is detected (e.g., when the BFI counter for the cell reaches the BFI maximum count, i.e. the beamFailureInstanceMaxCount IE) on the cell. While the BFR procedure is ongoing and the BWP switching criteria is activated (e.g., the UE receives the PDCCH indicating the BWP switch, the bwp-Inactivity Timer expires, etc.) for the cell, the UE may switch the BWP for the cell if one or more or any combination of the following conditions are satisfied. Otherwise, it may be up to the UE implementation whether to switch the BWP for the cell.

In some of the embodiments, the BWP switching criteria may be one or more than one combination(s) of the following.

In one embodiment, the PDCCH indicating the UL BWP switch for the cell (e.g., the BFRR indicating the UL BWP switch for the cell).

In one embodiment, the reception of the RRC (re-)configuration for the DL BWP switching for the cell.

In one embodiment, if the UE does not find any suitable and/or qualified NBI on the BWP where the BFR is detected.

In one embodiment, if there is no NBI configured for the BWP where the BFR is detected.

In one embodiment, if the UE is configured with the same set of the NBI(s) on the BWP before the BWP switching and on the BWP after the BWP switching.

In one embodiment, if a BWP switching command is indicated by the BFRR.

In one embodiment, if the BWP switching command is indicated by the PDCCH which indicates the success of the (cell) BFR procedure.

BFR MAC CE Reporting Criterion

Figure 5:
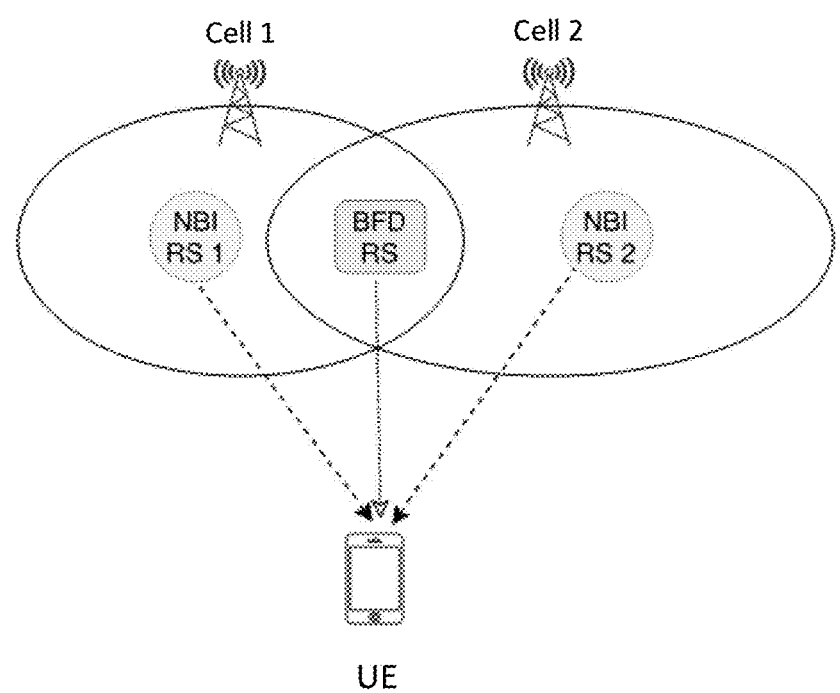
FIG. 5 illustrates an example of the BFD reference signal (RSs) and the new beam identification (NBI) RS configurations for cell(s) according to an example implementation of the present disclosure.

FIG. 5 illustrates an example of the BFD RSs and the NBI RS configurations for cell(s) according to an example implementation of the present disclosure. In some of the embodiments, the (set of) BFD RS(s) and/or the (set of) NBI RS(s) may be configured per (DL) BWP. Specifically, the configuration of the (set of) BFD RS(s) and/or the (set of) NBI RS(s) may be configured in the BWP configuration, e.g., BWP-DownlinkDedicated. Each BWP of one cell may have a different (set of) BFD RSs and/or different (set of) NBI RSs. It is noted that beam failure on multiple Cells may occur simultaneously. As illustrated in FIG. 5, a configured BFD RS may be associated with both Cell 1 and Cell 2. If the UE detects the beam failure based on the BFD RS, the UE may consider that both Cell 1 and Cell 2 encounter beam failure. If there are more than one cell that encounter beam failure simultaneously, it is important for the UE how to report some criteria associated with the beam failure related information (e.g., a serving cell index, a NBI RS index, a no new beam information, etc.) for the cell(s) via the BFR MAC CE. Assuming the suitable and/or qualified new beam of Cell 1 is NBI RS 1, and the suitable and/or qualified new beam of Cell 2 is NBI RS 2. It is practicable that reporting the beam failure related information may depend on which BFR MAC CE(s) may be applied. As previously disclosed, the BFR MAC CE may be the single-entry BFR MAC CE, as illustrated in FIG. 2, and/or the multi-entry BFR MAC CE, as illustrated in FIG. 3.

If (Only) the Multi-Entry BFR MAC CE May be Applied.

In some of the embodiments, if only the multi-entry BFR MAC CE is used, one alternative is that the UE may indicate all the cell indexes of the failed cells (e.g., via a bit map) if more than one cell encounters the beam failure simultaneously.

In one embodiment, if the UE detects that Cell 1 and Cell 2 encounter the beam failure (simultaneously) based on the BFD RS when the UE (instructs the Multiplexing and Assembly procedure to) generates the multi-entry BFR MAC CE, the UE may consider to indicate all the indexes of Cell 1 and Cell 2 via the multi-entry BFR MAC CE.

In some of the embodiments, the UE may indicate a subset (e.g., one or more than one beam-failed Cells) of all the beam-failed Cells in the BFR MAC CE. For example, if the BFD RS is associated with multiple cells when the UE detects that the beam failure occurs based on the BFD RS, the UE may consider that the multiple cells encounter the beam failure simultaneously. In such circumstances, the UE may only indicate one of the multiple cells via the multi-entry BFR MAC CE. The NW may know that the multiple Cells encounter the beam failure since the multiple cells are related to the same BFD RS.

In one embodiment, if the UE detects that Cell 1 and Cell 2 encounter the beam failure (simultaneously) based on the BFD RS when the UE (instructs the Multiplexing and Assembly procedure to) generates the multi-entry BFR MAC CE, the UE may determine to indicate one of the index of the Cell 1 or Cell 2 via the multi-entry BFR MAC CE.

BFD RS and NBI RS Configurations

In some of the embodiments, since the BFD RS and/or the NBI RS are configured by the NW, some alternatives for the NW to configure a suitable association between the BFD RS, NBI RS, and/or the cell(s) may be applied to avoid ambiguity in generating the BFR MAC CE in order to have some guidance or restrictions for the configuration of the BFD RS and/or the NBI RS.

In some of the embodiments, if the NW configures the BFD RS associated with multiple cells, the NW may have to configure a (set of) NBI RS which is also associated with the multiple cells. In other words, the UE may expect the NW to configure a (set of) NBI RS and a (set of) BFD RS which are associated the same (set) of cells. In some of the embodiments, the NBI RS may be used by the UE to detect the beam failure of a set of cells, and the BFR RS may be used by the UE to find the (common) new beam of the set of cells.

In one embodiment, assuming a set of BFD RS is configured to be associated with Cell 1 and Cell 2, a set of NBI RS may also be configured to be associated with Cell 1 and Cell 2.

For example, when the UE detects the beam failure based on the set of BFD RS, the UE may consider that Cell 1 and Cell 2 encounter the beam failure simultaneously. The UE may (only) measure the set of NBI RS to find the (common) new beam for Cell 1 and Cell 2. The UE may determine to indicate a new beam index from the set of NBI RS via the BFR MAC CE. If the UE does not find any qualified new beam from the set of NBI RS, the UE may indicate "no new beam information" via the BFR MAC CE.

In some of the embodiments, the NW may not configure a (set of) BFD RS which is associated with more than one cells. Preferably, the NW only configures a (set of) BFD RS which is associated with one cell. Preferably, the UE expects that the configured (set of) BFD RS is only associated with one cell. If the UE detects the beam failure based on the configured (set of) BFD RS, the UE may consider that the beam failure occurs on this cell which is associated with the BFD RS. In such circumstances, the UE may measure a (set of) BFD RS which is associated with this cell to find a new beam for this cell.

In another embodiment, the association between the (set of) BFD RS(s), the (set of) NBI RS(s), and/or the corresponding (set of) cell(s) are configured by the NW, e.g., via the RRC configuration.

Figure 6:
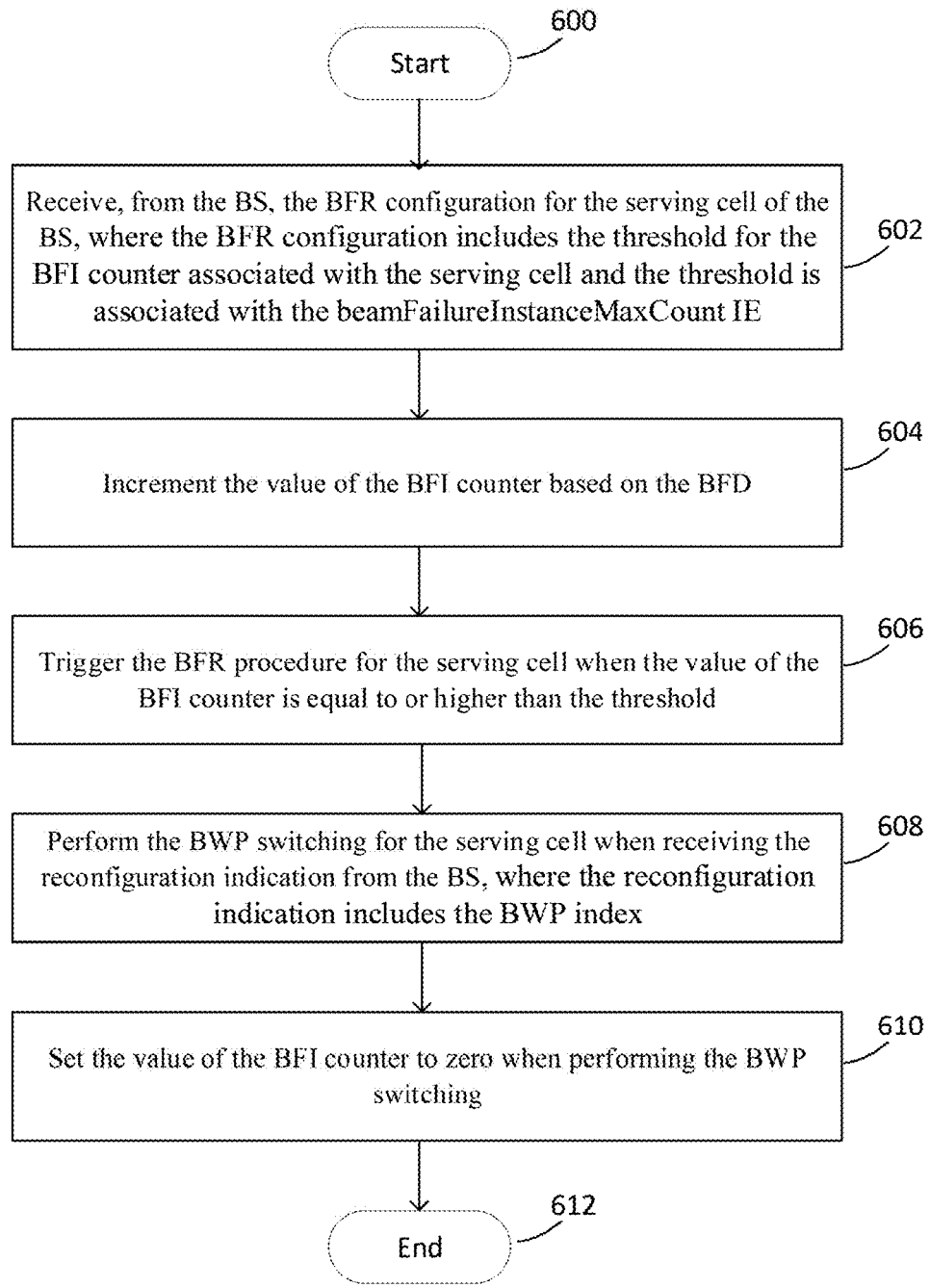
FIG. 6 illustrates a BFR procedure performed by a UE according to an example implementation of the present disclosure.

FIG. 6 illustrates a BFR procedure 60 performed by a UE according to an example implementation of the present disclosure. As illustrated in FIG. 6, the BFR procedure 60 for a serving cell includes the following steps:

Step 600: Start.

Step 602: Receive, from the BS, the BFR configuration for the serving cell of the BS, where the BFR configuration includes the threshold for the BFI counter associated with the serving cell and the threshold is associated with the beamFailureInstanceMaxCount IE.

Step 604: Increment the value of the BFI counter based on the BFD.

Step 606: Trigger the BFR procedure for the serving cell when the value of the BFI counter is equal to or higher than the threshold.

Step 608: Perform the BWP switching for the serving cell when receiving the reconfiguration indication from the BS, where the reconfiguration indication includes the BWP index.

Step 610: Set the value of the BFI counter to zero when performing the BWP switching.

Step 612: End.

Preferably, step 602 to step 610 of the BFR procedure 60 may be applied to a serving cell (e.g., PCell, PSCell, SCell). In other words, the BFR configurations (e.g., parameter, counter, timer, etc.) are applied on a per serving cell basis. Preferably, the UE may be configured to increment the value of the BFI counter for a serving cell based on the BFD for the RS (e.g., Failure Detection Resources) which is associated with the serving cell. When the value of the BFI counter for the serving cell is equal to or higher than the threshold (e.g. the beamFailureInstanceMaxCount IE), the UE may trigger the BFR procedure for the serving cell (i.e. the corresponding cell). Accordingly, when the UE has received the reconfiguration indication for the serving cell from the BS, the UE may be configured to perform the BWP switching for the serving cell. Upon receiving the reconfiguration indication and/or upon performing the BWP switching, the UE may be configured to set the value of the BFI counter to zero (i.e. to reset the value of the BFI counter). Since detailed operations of the step 602 to step 610 have been comprehensively discussed and/or introduced in the previous disclosure, it is unnecessary to repeat the detailed operations for brevity.

Figure 7:
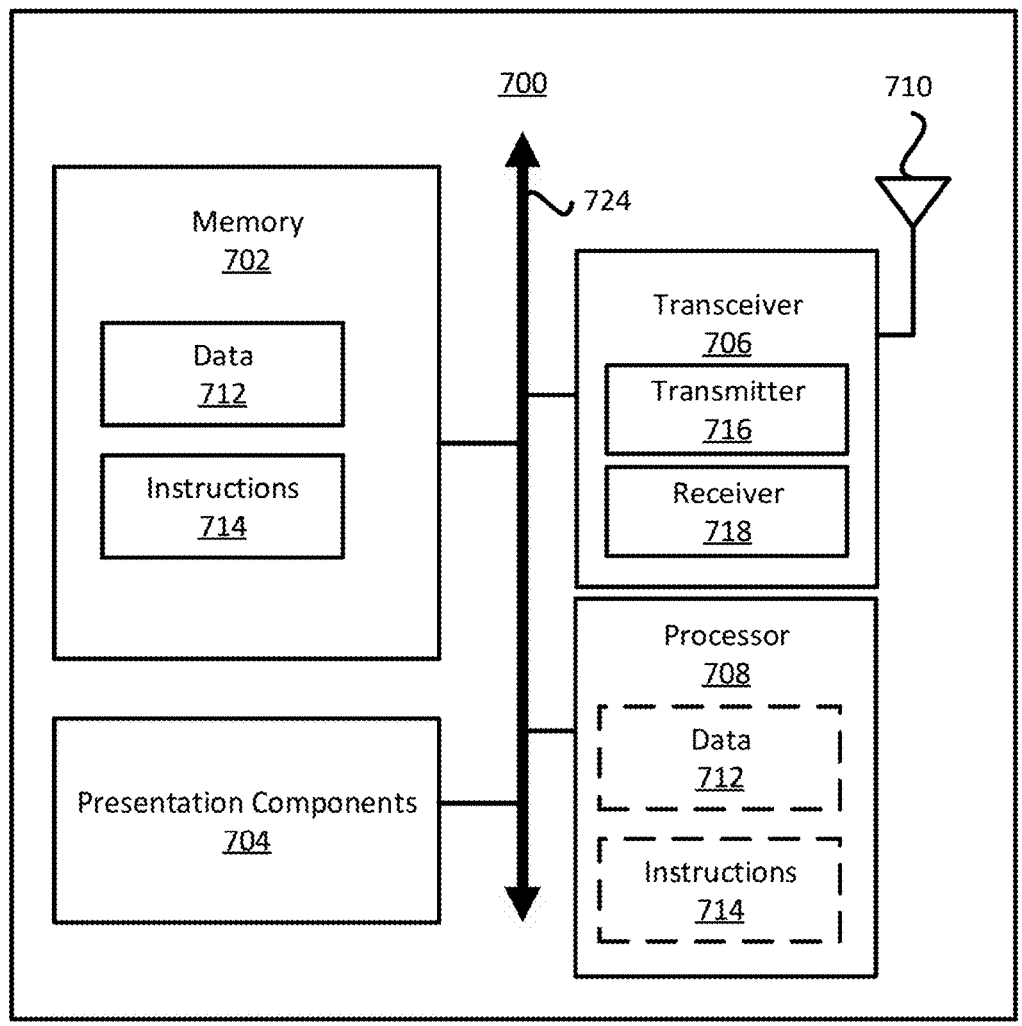
FIG. 7 illustrates a block diagram of a node for wireless communication in accordance with various aspects of the present disclosure.

FIG. 7 illustrates a block diagram of a node 700 for wireless communication according to an example implementation the present disclosure. As illustrated in FIG. 7, the node 700 may include a transceiver 706, a processor 708, a memory 702, one or more presentation components 704, and at least one antenna 710. The node 700 may also include a Radio Frequency (RF) spectrum band module, a BS communications module, an NW communications module, and a system communications management module, input/output (I/O) ports, I/O components, and power supply (not explicitly illustrated in FIG. 7). Each of these components may be in communication with each other, directly or indirectly, over one or more buses 724. In one implementation, the node 700 may be a UE or a BS that performs various functions disclosed herein, for example, with reference to FIGS. 1 through 6.

The transceiver 706 having a transmitter 716 (e.g., transmitting/transmission circuitry) and a receiver 718 (e.g., receiving/reception circuitry) may be configured to transmit and/or receive time and/or frequency resource partitioning information. In one implementation, the transceiver 706 may be configured to transmit in different types of subframes and slots, including, but not limited to, usable, non-usable and flexibly usable subframes and slot formats. The transceiver 706 may be configured to receive data and control channels.

The node 700 may include a variety of computer-readable media. Computer-readable media may be any available media that may be accessed by the node 700 and include both volatile (and non-volatile) media and removable (and non-removable) media. By way of example, and not limitation, computer-readable media may include computer storage media and communication media. Computer storage media may include both volatile (and non-volatile) and removable (and non-removable) media implemented according to any method or technology for storage of information such as computer-readable.

Computer storage media includes RAM, ROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media does not include a propagated data signal. Communication media may typically embody computer-readable instructions, data structures, program modules, or other data in a modulated data signal such as a carrier wave or other transport mechanism and include any information delivery media. The term "modulated data signal" may mean a signal that has one or more of its characteristics set or changed in such a manner as to encode information in the signal. By way of example, and not limitation, communication media may include wired media such as a wired NW or direct-wired connection, and wireless media such as acoustic, RF, infrared and other wireless media. Combinations of any of the previous disclosure should also be included within the scope of computer-readable media.

The memory 702 may include computer-storage media in the form of volatile and/or non-volatile memory. The memory 702 may be removable, non-removable, or a combination thereof. For example, the memory 702 may include solid-state memory, hard drives, optical-disc drives, etc. As illustrated in FIG. 7, the memory 702 may store computer-readable and/or -executable instructions 714 (e.g., software codes) that are configured to, when executed, cause the processor 708 to perform various functions disclosed herein, for example, with reference to FIGS. 1 through 6. Alternatively, the instructions 714 may not be directly executable by the processor 708 but may be configured to cause the node 700 (e.g., when compiled and executed) to perform various functions disclosed herein.

The processor 708 (e.g., having processing circuitry) may include an intelligent hardware device, a Central Processing Unit (CPU), a microcontroller, an ASIC, etc. The processor 708 may include memory. The processor 708 may process the data 712 and the instructions 714 received from the memory 702, and information through the transceiver 706, the baseband communications module, and/or the NW communications module. The processor 708 may also process information to be sent to the transceiver 706 for transmission through the antenna 710, to the NW communications module for transmission to a CN.

One or more presentation components 704 may present data indications to a person or other device. Examples of presentation components 704 may include a display device, speaker, printing component, vibrating component, etc.

From the previous disclosure, it is manifested that various techniques may be used for implementing the concepts described in the present disclosure without departing from the scope of those concepts. Moreover, while the concepts have been disclosed with specific reference to certain implementations, a person of ordinary skill in the art would recognize that changes may be made in form and detail without departing from the scope of those concepts. As such, the disclosed implementations are to be considered in all respects as illustrative and not restrictive. It should also be understood that the present disclosure is not limited to the particular disclosed implementations. Still, many rearrangements, modifications, and substitutions are possible without departing from the scope of the present disclosure.

What is claimed is:

1. A method performed by a User Equipment (UE) for a Beam Failure Recovery (BFR) procedure, the method comprising:
   receiving, from a Base Station (BS), a BFR configuration for a serving cell of the BS, wherein the serving cell is a secondary cell (SCell), the BFR configuration includes a threshold for a Beam Failure Instance (BFI) counter associated with the serving cell, and the threshold is associated with a beamFailureInstanceMaxCount information element (IE);
   incrementing a value of the BFI counter based on a Beam Failure Detection (BFD);
   triggering the BFR procedure for the serving cell when the value of the BFI counter is equal to or higher than the threshold;
   performing a Band Width Part (BWP) switching for the serving cell in response to receiving a reconfiguration indication from the BS during the BFR procedure, wherein the reconfiguration indication includes a BWP index; and
   setting the value of the BFI counter to zero and reconfiguring at least one parameter for the serving cell when performing the BWP switching during the BFR procedure,
   wherein the at least one parameter includes at least one of a parameter associated with the BFI counter, a parameter associated with a BFD timer, or a Reference Signal (RS) associated with the BFD, wherein setting the value of the BFI counter to zero comprises:
   setting the value of the BFI counter to zero when the serving cell is deactivated, wherein the serving cell is deactivated when the UE receives an SCell Activation/Deactivation Medium Access Control (MAC) Control Element (CE) for deactivating the serving cell or when an SCell deactivation timer for the serving cell is expired, or
   setting the value of the BFI counter to zero when receiving, from the BS, a BFR response (BFRR) for the serving cell during the BFR procedure, and
   wherein:
   the BFRR is received from a Physical Downlink Control Channel (PDCCH) of the serving cell, and is addressed by a Cell-Radio Network Temporary Identifier (C-RNTI) to indicate an uplink grant for a new transmission,
   the uplink grant is scheduled for a Hybrid Automatic Repeat Request (HARQ) process used for a transmission of a BFR MAC CE, and
   the BFR MAC CE includes at least one of a cell identity of the serving cell, a beam-presence indicator of the serving cell, or a candidate beam indicator of the serving cell.

2. The method of claim 1, further comprising considering that the BFR procedure is successfully completed upon receiving the BFRR.

3. The method of claim 1, wherein setting the value of the BFI counter to zero further comprises setting the value of the BFI counter to zero when the BFR procedure is successfully completed.

4. The method of claim 1, wherein the reconfiguration indication is received via Radio Resource Control (RRC) signaling.

5. The method of claim 1, wherein the BFR procedure is an SCell BFR procedure.

6. The method of claim 1, wherein the BWP index is associated with a firstActiveDownlinkBWP IE.

7. A User Equipment (UE) for performing a Beam Failure Recovery (BFR) procedure, the UE comprising:
   at least one memory storing computer-executable instructions; and
   at least one processor coupled to the at least one memory, wherein the computer-executable instructions, when executed by the at least one processor, cause the UE to:
   receive, from a Base Station (BS), a BFR configuration for a serving cell of the BS, wherein the serving cell is a secondary cell (SCell), the BFR configuration includes a threshold for a Beam Failure Instance (BFI) counter associated with the serving cell, and the threshold is associated with a beamFailureInstanceMaxCount information element (IE);
   increment a value of the BFI counter based on a Beam Failure Detection (BFD);
   trigger the BFR procedure for the serving cell when the value of the BFI counter is equal to or higher than the threshold; and
   perform Band Width Part (BWP) switching for the serving cell in response to receiving a reconfiguration indication from the BS during the BFR procedure, wherein the reconfiguration indication includes a BWP index; and
   set the value of the BFI counter to zero and reconfigure at least one parameter for the serving cell when performing the BWP switching during the BFR procedure,
   wherein the at least one parameter includes at least one of a parameter associated with the BFI counter, a parameter associated with a BFD timer, or a Reference Signal (RS) associated with the BFD, wherein setting the value of the BFI counter to zero comprises:
   setting the value of the BFI counter to zero when the serving cell is deactivated, wherein the serving cell is deactivated when the UE receives an SCell Activation/Deactivation Medium Access Control (MAC) Control Element (CE) for deactivating the serving cell or when an SCell deactivation timer for the serving cell is expired, or
   setting the value of the BFI counter to zero when receiving, from the BS, a BFR response (BFRR) for the serving cell during the BFR procedure, and
   wherein:
   the BFRR is received from a Physical Downlink Control Channel (PDCCH) of the serving cell, and is addressed by a Cell-Radio Network Temporary Identifier (C-RNTI) to indicate an uplink grant for a new transmission,
   the uplink grant is scheduled for a Hybrid Automatic Repeat Request (HARQ) process used for a transmission of a BFR MAC CE, and
   the BFR MAC CE includes at least one of a cell identity of the serving cell, a beam-presence indicator of the serving cell, or a candidate beam indicator of the serving cell.

8. The UE of claim 7, wherein the computer-executable instructions, when executed by the at least one processor, further cause the UE to consider that the BFR procedure is successfully completed upon receiving the BFRR.

9. The UE of claim 7, wherein setting the value of the BFI counter to zero further comprises setting the value of the BFI counter to zero when the BFR procedure is successfully completed.

10. The UE of claim 7, wherein the reconfiguration indication is received via Radio Resource Control (RRC) signaling.

11. The UE of claim 7, wherein the BFR procedure is an SCell BFR procedure.

12. The UE of claim 7, wherein the BWP index is associated with a firstActiveDownlinkBWP IE.

* * * * *